(12) United States Patent
Salas et al.

(10) Patent No.: US 7,249,176 B1
(45) Date of Patent: Jul. 24, 2007

(54) MANAGING USER ACCESS OF DISTRIBUTED RESOURCES ON APPLICATION SERVERS

(75) Inventors: Jonathan C. Salas, Byron, CA (US); Sanjeev Radhakrishnan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 686 days.

(21) Appl. No.: 09/845,457

(22) Filed: Apr. 30, 2001

(51) Int. Cl.
*G06F 15/173* (2006.01)

(52) U.S. Cl. .................. 709/225; 725/25; 725/29; 726/1; 726/3; 726/4; 726/10; 713/155

(58) Field of Classification Search .......... 709/229, 709/223, 224, 203, 225, 227, 201; 713/200, 713/201, 150, 155; 705/52; 707/1, 9, 10; 717/178; 725/25, 29; 726/1, 3, 4, 10
See application file for complete search history.

(56) References Cited

U.S. PATENT DOCUMENTS

| | | | | |
|---|---|---|---|---|
| 6,049,789 | A * | 4/2000 | Frison et al. ................. | 705/59 |
| 6,453,420 | B1 * | 9/2002 | Collart ........................ | 713/201 |
| 6,463,457 | B1 * | 10/2002 | Armentrout et al. ........ | 709/201 |
| 6,513,121 | B1 * | 1/2003 | Serkowski ................... | 726/29 |
| 6,546,002 | B1 * | 4/2003 | Kim ........................... | 370/351 |
| 6,611,862 | B2 * | 8/2003 | Reisman ..................... | 709/217 |
| 6,687,735 | B1 * | 2/2004 | Logston et al. ............. | 709/203 |
| 6,697,948 | B1 * | 2/2004 | Rabin et al. ................. | 713/200 |
| 6,718,328 | B1 * | 4/2004 | Norris ......................... | 707/9 |
| 6,728,766 | B2 * | 4/2004 | Cox et al. ................... | 709/220 |
| 6,918,113 | B2 * | 7/2005 | Patel et al. ................. | 717/178 |
| 6,983,479 | B1 * | 1/2006 | Salas et al. .................. | 725/23 |
| 7,111,300 | B1 * | 9/2006 | Salas et al. ................. | 718/105 |

\* cited by examiner

*Primary Examiner*—Nathan J. Flynn
*Assistant Examiner*—Mohammad Siddiqi
(74) *Attorney, Agent, or Firm*—Osha Liang LLP

(57) ABSTRACT

A method and system to manage user access to resources and computing tasks on servers located on a network. The preferred embodiments of this system would enable a resource provider to manager user access to resources based on user specific criteria and resource specific criteria. The invention creates user associated access session(s) and generates tokens corresponding to such access session(s) to allow user access. The system is able to manage any type or any combination of licensing criteria, to manage different licensing criteria associated with the same user, to manage different licensing criteria associated with the same resource, and to manage different licensing relationship among users and resources. The system is scalable as additional sets of license managers can be added to manage additional users and resources. Optionally, secondary access sessions are provided to users to allow for completion of a current task when initial access session(s) are depleted.

16 Claims, 4 Drawing Sheets

Fullfilment of Application Request 4000

US 7,249,176 B1

MANAGING USER ACCESS OF DISTRIBUTED RESOURCES ON APPLICATION SERVERS

BACKGROUND INFORMATION

1. Field of the Invention

The invention relates in general to a distributed computing system, particularly to a system that manages user access to resources residing on a network.

2. Description of Related Art

As more and more computers are connected via the Internet or a network such as an intranet or wide-area-network (WAN), resources such as databases, software applications, hardware devices, and electronic appliances can be shared among users within a network. Specifically, an application service provider (ASP) model, in which applications residing on a remote server are provided to a plurality of users who pay for such applications, requires a system to verify and manage user access to such applications.

Presently, various licensing managing methods have been developed to address the management of user access. For example, many software applications are licensed on a computer-by-computer basis or by user basis, in which each computer or each user is given a unique license key to initiate access to a resource. However, this sort of licensing management system is limiting, as it cannot accommodate other licensing criteria such as by usage basis, by time basis, by user-to-user relationship, or by priority basis. This extensibility to manage any type or combination of license criteria is especially important in an ASP model, as the service provider is required to handle numerous different licensing policies for each application and each user.

Licensing management systems have been developed to accommodate additional licensing criteria such as a pay-per-user licensing system disclosed in U.S. Pat. No. 6,049,789, Frison, et al., in which a licensing manager monitors usage and bills the user accordingly for use. However, the system lacks the flexibility to handle different licensing policy criteria associated with a same user or among a group of different users, and different licensing policy criteria associated with a same application or among a group of different applications. In addition, prior art license management systems need to be programmed to handle different license policies and often are not compatible with each other.

Therefore, it is advantageous to have an extendible and flexible system to manage any combination of license criteria that a resource provider requires.

SUMMARY OF THE INVENTION

The invention enables management of user access to distributed resources on a network. The infrastructure for this system is a network, which enables a set of license managers to control user access of resources distributed on a network.

The preferred embodiments of this system would enable a resource provider, such as an application service provider, to manager user access based on any combination of license criteria associated with a specific user or associated with a specific application. Each usage or policy instance is evidenced by a token creation by a license manager and said token enables user access to resources. The system is scalable as additional sets of license managers can be added to manage users and applications. In addition, access can be extended by providing for one or more secondary policy instances and notifying user for renewal or creation of new policy instances.

DETAILED DESCRIPTION OF PREFERRED EMBODIMENT

Figure 1:
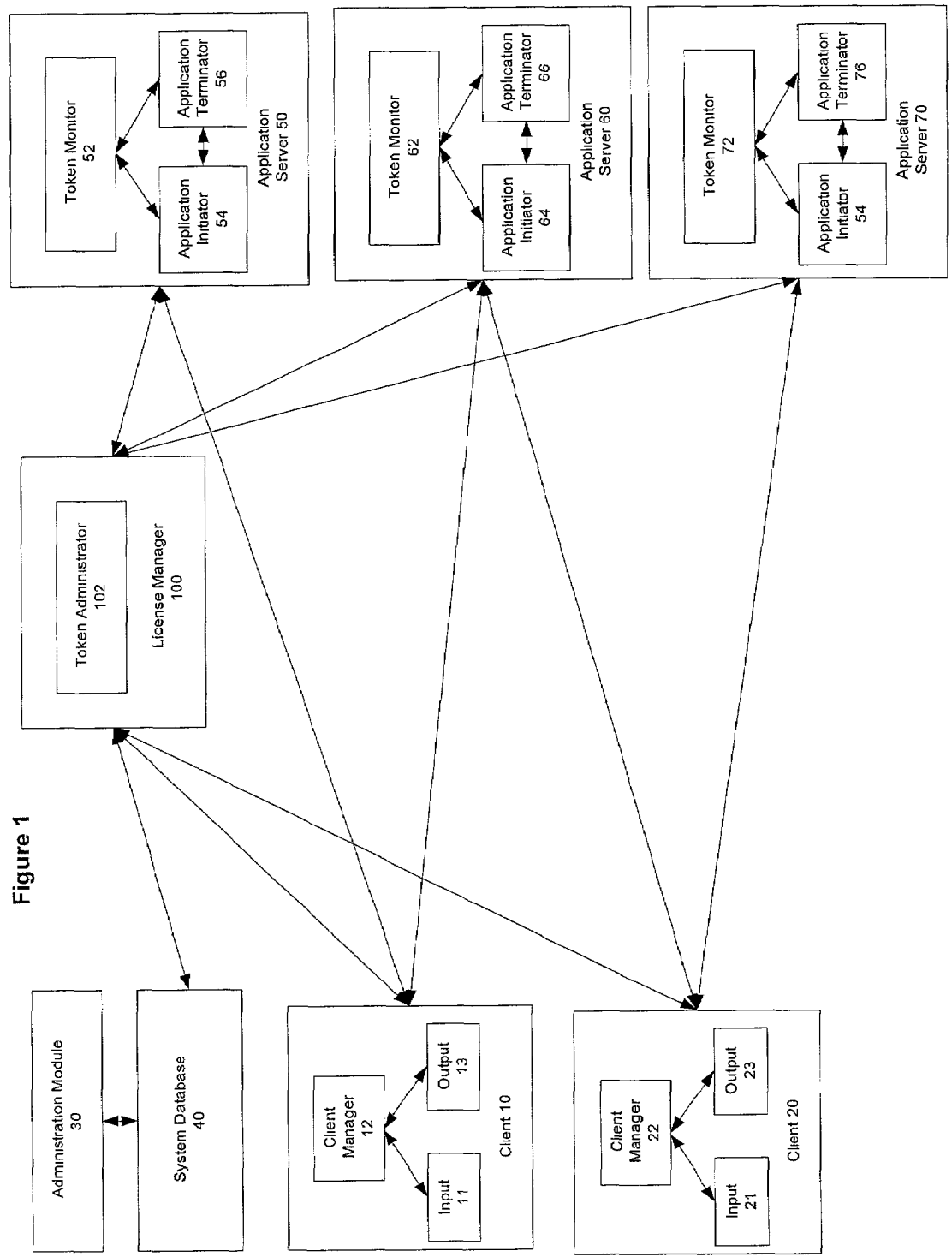
FIG. 1 is a block diagram of a user access management system having a client component 10, license manager 100, and application servers 50 60 70 in accordance with one embodiment of the present invention.

The elements of the user access management system in accordance with the invention can essentially be divided into three distinct components: client component(s) 10 20, license manager 100, and resource component, in which a preferred embodiment comprises application servers 50 60 70, as illustrated in FIG. 1.

The system enables a resource provider to monitor user access to various resources connected on a network or wirelessly, such as software applications, hardware devices, databases, printers, computers, and personal digital assistants (PDAs). As computing tasks become more distributed among various resources, various user and resource licensing policies have to be managed to ensure that resource providers are compensated, user relationship is maintained, priority of tasks is maintained, and resource costs are within a budget. Also, the combination of licensing criteria can be endless. Thus, without a robust resource management system, organizations are forced to select a few simple licensing policies such as access by user or by usage.

In the preferred embodiment, the system is used in an Application Service Provider (ASP) model, in which software applications reside on servers, and clients share and access the applications from the servers via a network. However, one skilled in the art should realize that the resource could be software or microprocessor machine that can execute a computing task, such as a printer, a web-content server, or a database.

All components of the system (client, license manager, and resource) are connected to the system via registration through the administration module 30 and stored in a system database 40. The client component 10 consists an input module 11 to request a resource, a client manager 12 to track input and output data, and an output module 13 to present the resource or a product of the resource. Client 10 communicates to the other components of the system via a network such as Internet, a local area network (LAN) and/or wide area network (WAN), wireless and/or wired, or other network communication infrastructure.

In addition to the registration of each component to the system, various policy license types such as by user, by usage, client, by time, by date, by resource are registered into the system database 40 via administration module 30. Also, additional parameters are associated with each policy type to create user access session(s) or policy instance(s), which are then assigned to each corresponding user. The term "user access sessions or policy instances" as described herein is defined as allocated user access associated with a set of licensing criteria. For example, a policy license type that permits access by usage can be selected and furthered modified to create a policy instance 1 for user A with parameters including 10 hours of usage, during the month of March, to application server 50, on Monday thru Friday, and no more than 2 hours per day. For each criteria or a combination of criteria, a specific policy instance is created to reflect the criteria. Thus, if user A also has access to application 60 on Sunday thru Saturday, a policy instance 2 may be created with parameters including "access to application 60" and "on Sunday thru Saturday." In an alternative embodiment, policy instance(s) can be created for each resource. For example, if the application server 50 can be accessed only on Saturday and by authorized managers, the application server 50 would have an associated policy instance 3 with parameters including "Saturday access" and "by authorized managers." Since each criteria and combination of criteria can be added to common policy types to create policy instances, the system is able to handle different licensing policies and relationships among users. Optionally, secondary policy instances or any additional policy instances (e.g. 10 minutes of usage billed separately, extra number of files produced, extra number of pages printed, and etc) are provided and assigned to users so that if the initial policy instances are depleted, users can utilize these additional resources to complete their current work. Also, these additional policy instances can be utilized in priority schemes. For example, if a license policy is that a user C accesses server 50 before accessing server 60, user C will have an initial policy instance with parameter, "access server 50," and a secondary policy instance with parameter, "access server 60." In the above example, user C will deplete his access to server 50 before accessing his access to server 60.

After registration and assignment of policy instances to each user, a user utilizes the client 10 to communicate a software application request to the application server 50 that has the application. Also, the application request is communicated to the license manager 100 and the request is processed by a token administrator 102, as illustrated furthered in FIG. 3. The token administrator 102 of the license manager 100 will verify user access and associated policy instances on the database 40. If verified, the token administrator generates a token for the client 10 to access application on application server 50. Within the application server 50, a token monitor 52 processes the token and initiates access via an application initiator 54 or terminates access via an application terminator 56. This fulfillment of resource request is described in more detail in FIG. 4.

Figure 2A:
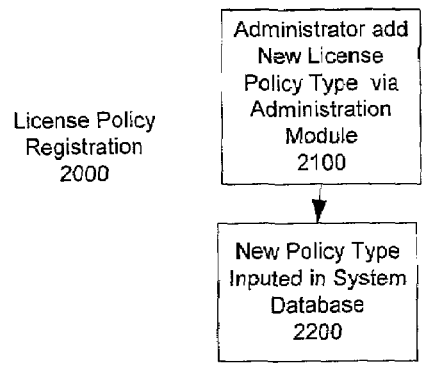
FIG. 2 is a logical flow chart that describes a process for license policy registration.
Figure 2B:
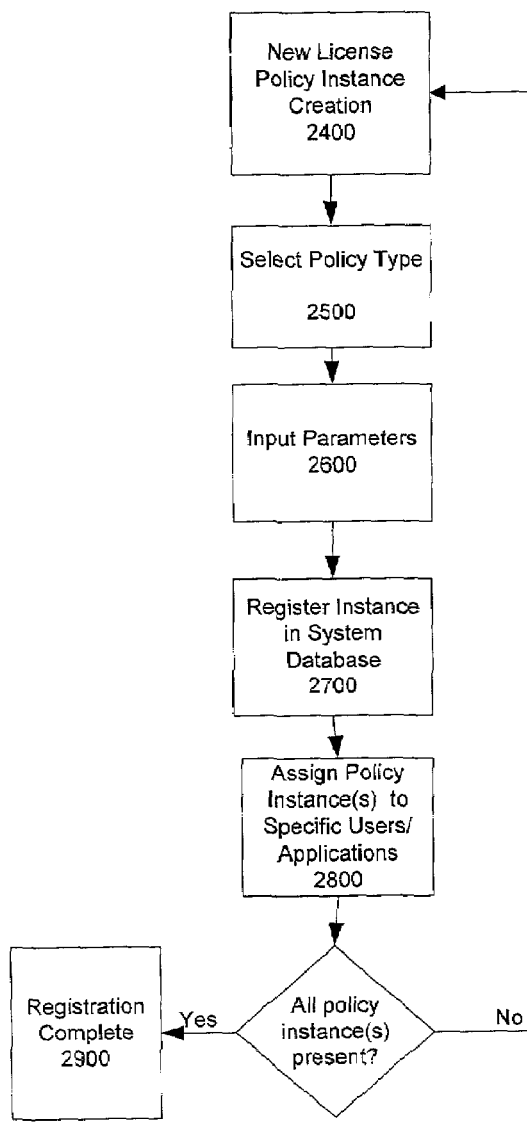

FIGS. 2a–2b describes the process for a license policy registration 2000, particularly to an application license in an ASP model. In the initial registration as shown in FIG. 2a, a system administrator will add new license policy types with associated parameters such as by user, by resource, by time, by task priority, and by time 2100. For example, a by time policy type monitors access based on a time specified such as the month of March. Associated parameters relating to each policy type is entered into system database 2200, which allows re-use of parameters commonly associated with such policy type.

Referring to FIG. 2b, specific policy instances are created for each criteria of a license policy. New policy instances are created for each user 2400 by selecting policy type 2500 and then modifying each policy type by adding user specific parameters to create policy instances specific to each user 2600. For example, if user B's license policy is usage in the month of March and only access from 9:00 am to 5:00 pm, a policy instance 3 is created by adding the user specific parameters, from "9:00 am to 5:00 pm," to by time policy type, "Month of March," specified above.

Additionally, new policy instances can be created for each resource. For example, the server application 50 can have a policy instance 4 that specifies by user policy type with application specific parameters such as "Monday Access." All created policy instances is stored in the system database 2700 and assigned to specific users or applications 2800. If all policy instances associated with user/resource are present, registration is complete 2900. If all policy instances are not present, new policy instances creation process reiterates until all policy instances associated with user/resource are created and assigned.

Figure 3:
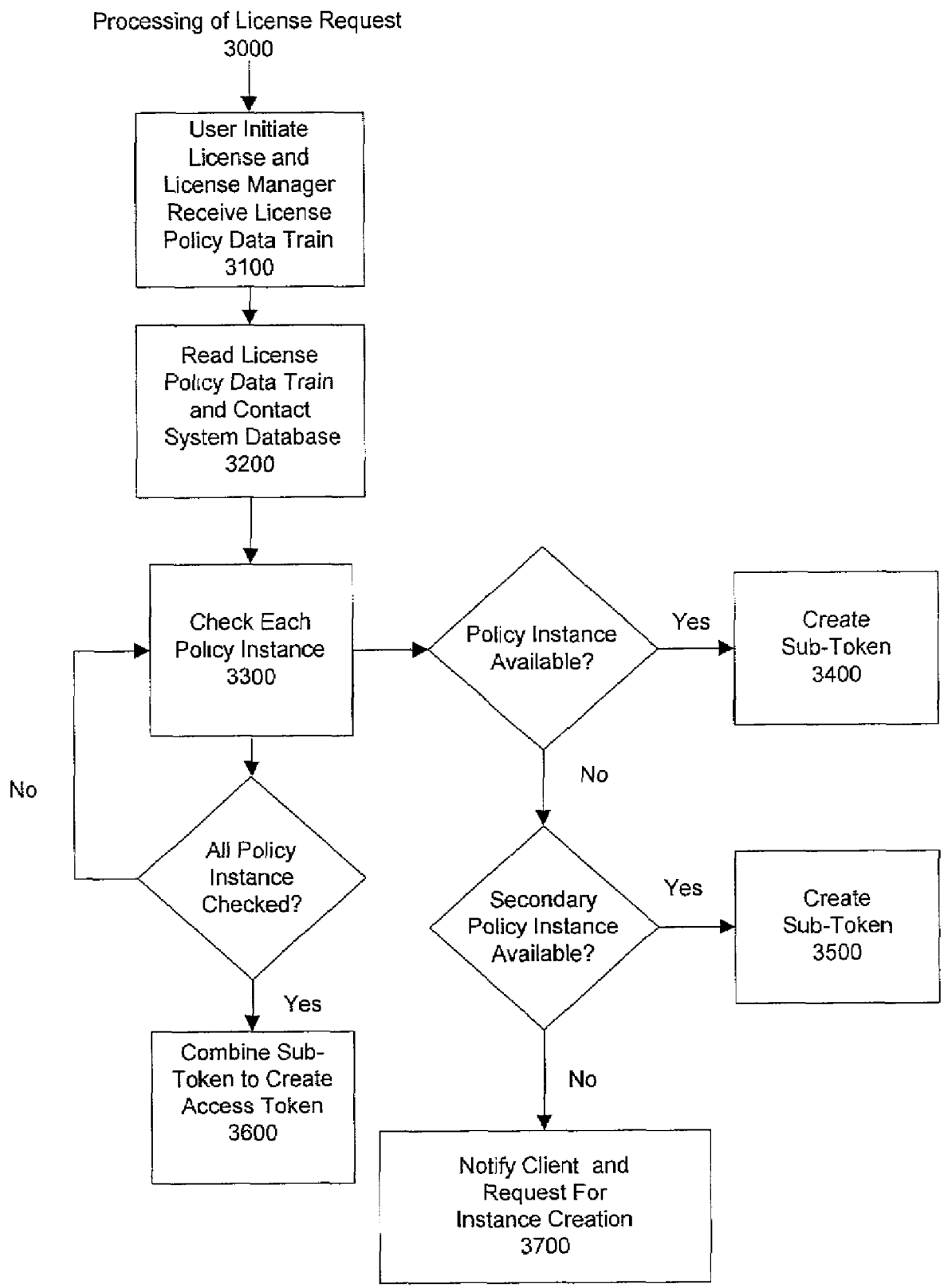
FIG. 3 is a logical flow chart that describes a process for license request processing.

FIG. 3 describes the processing of a license request according to one embodiment of the invention. The user initiates license requests and a license manager receives policy data train 3100. The term "license policy data train" as described herein is defined as a list of policy instances. The license manager reads the license policy train and contact system database 3200 to check each policy instance for availability 3300. If a policy instance is available, the token administrator of the license manager creates a sub-token, which enables access to the resource. Since each policy instance is associated with a specific parameter, a user is allowed access when each sub-token corresponding to each policy instance is present. For example, if the license policy is that a user E has access to server 50 on Monday for one hour, user E will need to submit three sub-tokens, one for "server 50", one for "Monday," and one for "one hour." Alternatively, each sub-token may be associated with a policy instance that has a plurality of criteria. For example, instead of 3 sub-tokens, user E may provide one sub-token for an hour access on Monday and one sub-token for server 50 access. By dividing a complicated license policy into separate policy instances, each instance needs only to monitor its own access, and numerous combinations of instances can be created to reflect any license policy. Additionally, sub-tokens associated with a policy instance can allow access to only a portion of the resource access allocation. For example, if the policy instance provides 100 minutes of access, the sub-token created can allow access for 10 minutes and when the sub-token expired, another sub-token will be created if additional minutes remain in the policy instance. This eliminates the requirement to monitor the usage of the user on the client side.

After checking all policy instances and if one or more policy instances are available, the sub-token(s) created in step 3400 are combined into an access token and is returned to client 3600. The term "access token" as described herein is defined as an aggregate of the sub-tokens associated with a policy data train. If a policy instance is not available, secondary or additional policy instances are checked for availability. The term "secondary or additional policy instances" as described herein is defined as additional allocated access sessions. For example, a user can purchase an emergency reserve so that if his initial access is depleted, he is able to tap into this emergency reserve to complete his work or save work to a disc. If there are secondary policy instances available, sub-tokens corresponding to the secondary policy instances are created and sent to client 3500. If no secondary policy instances are available, the client is notified that access is depleted and a request for new policy instance creation is made 3700. Additionally, a notification of time to create new policy instances can be sent to client when access is reduce to a certain level.

Figure 4:
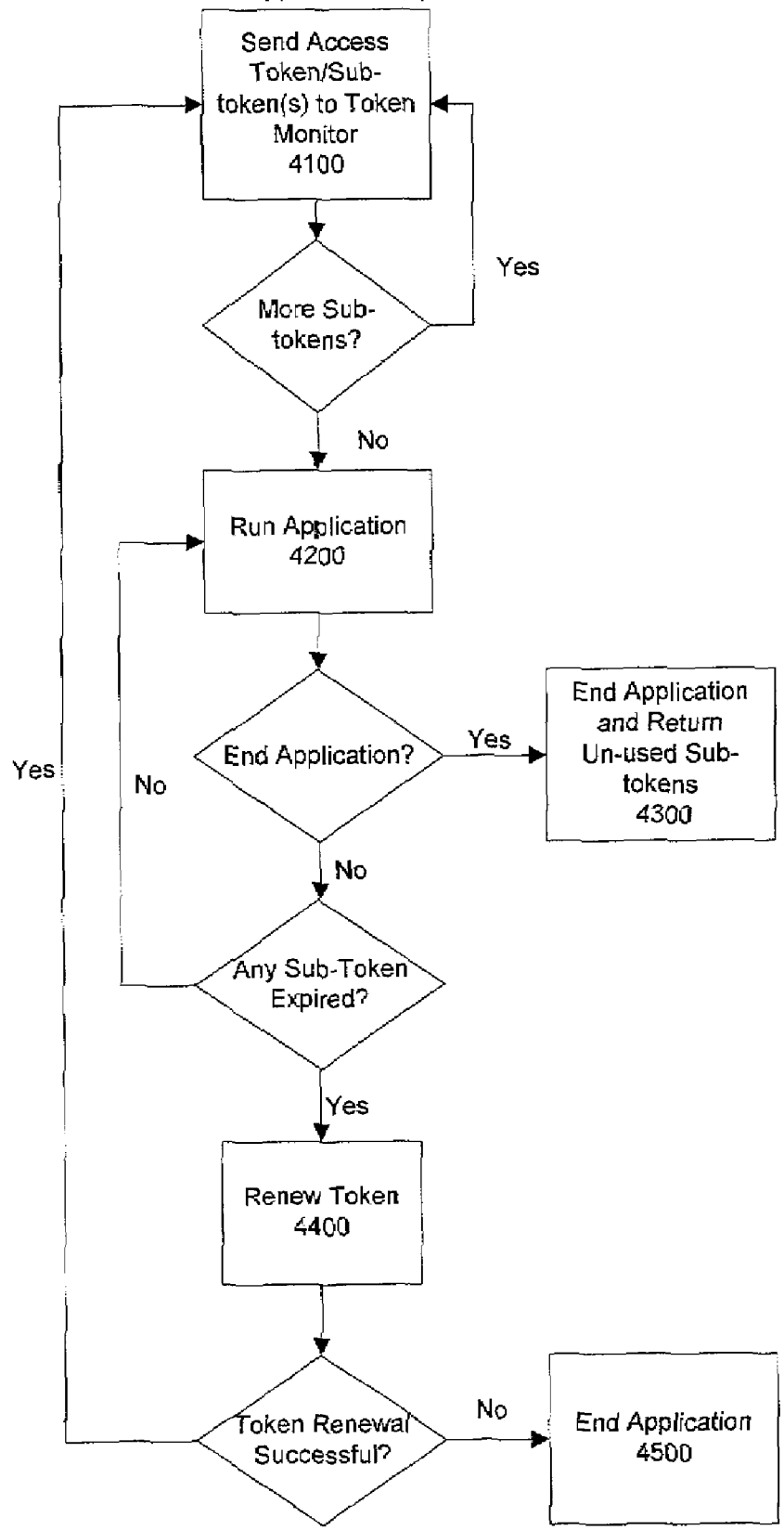
FIG. 4 is a logical flow chart that describes a fulfillment process of a sample usage of the system, wherein a resource request is a request for a software application.

FIG. 4 describes the process for fulfilling a client request of an application 4000. After the processing of request and creation of sub-tokens, as illustrated above in FIG. 3, the client sends the access token to the token monitor 4100, which checks to see whether there are any more sub-tokens required to allow access. If there are additional sub-tokens, the sub-tokens are sent to the token monitor until there are not more sub-tokens. If user request to end application, the application terminator ends the application and access allocation remaining on the sub-token(s) is returned to the system database 4300. If user continues request for the application, the token monitor initiates application via the application initiator 4200 until a sub-token expires. When a sub-token expires, the token monitor renews the sub-token 4400. If renewal is successful, a sub-token is created and sent to the token monitor 4100 and the fulfillment process reiterates 4000. If renewal is not successful, the token monitor ends the application 4500 via the application terminator. Additionally, the token monitor comprises a criteria evaluator (e.g. a timer, a counter, a calendar, a heat sensor, and etc.) that determines the expiration of the sub-token. For example, if the sub-token is for Monday thru Friday, the token evaluator will be a calendar that determines the expiration of the sub-token based on what day of the week access is requested.

The above embodiments are only illustrative of the principles of this invention and are not intended to limit the invention to the particular embodiments described. One skilled in the art should recognize that resources could include all types of resources such as software applications, hardware devices, computing machines, and etc. In particular, it is contemplated that functional implementation of the invention described herein may be implemented equivalently in hardware, software, firmware, and/or other available functional components or building blocks. Accordingly, various modifications, adaptations, and combinations of various features of the described embodiments can be practiced without departing from the scope of the invention as set forth in the appended claims.

We claim:

1. An apparatus, comprising:
   a client coupled, via a network, to a plurality of resources, wherein said plurality of resources is located on an application server; and
   a system configured to control access to said plurality of resources, the system including:
      a database configured to store a first license policy type, a second license policy type, a first policy instance, and a second policy instance, wherein the first policy instance is generated using the first license policy type and a first user specific parameter and the second policy instance is generated using the second policy type and a second user specific parameter, wherein the first user specific parameter and the second user specific parameter are associated with a same user;
      a license manager configured to generate a token using the following steps:
         creating a first sub-token using the first policy instance;
         creating a second sub-token using the second policy instance; and
         combining the first sub-token and the second sub-token to generate the token,
      wherein the token enables the user to access one of said plurality of resources; and
      a token monitor configured to initiate and terminate access to said one of said plurality of resources according to said token, wherein the token monitor is located on said application server.

2. The apparatus of claim 1, wherein the token monitor comprises a criteria evaluator, wherein the criteria evaluator is configured to notify the token monitor when the first sub-token expires.

3. The apparatus of claim 2, wherein the criteria evaluator is configured to use a calendar to determine whether the first sub-token has expired.

4. The apparatus of claim 2, wherein the criteria evaluator is configured to use a counter to determine whether the first sub-token has expired.

5. The apparatus of claim 2, wherein the criteria evaluator is configured to use a timer to determine whether the first sub-token has expired.

6. The apparatus of claim 1, further comprising:
   a secondary access database configured to generate a third sub-token using a third policy instance, wherein the third sub-token is created after the first sub-token has expired and the third sub-token enables the same user to access said one of said plurality of resources.

7. The apparatus of claim 1, wherein a notification to create a new policy instance is sent to the client after the first sub-token has expired.

8. The apparatus of claim 1, wherein the first policy type is one selected from the group consisting of by user, by usage, by client, by time, by date, and by resource.

9. The apparatus of claim 1, wherein the token monitor is further configured to attempt to renew the first sub-token after the first sub-token expires.

10. A method for managing access to a resource on a network comprising:
   creating a first policy instance and a second policy instance, wherein the first policy instance is created using a first license policy type and a first user specific parameter and the second policy instance is created using a second policy type and a second user specific parameter, wherein the first user specific parameter and the second user specific parameter are associated with a same user;
   verifying the first policy instance and the second policy instance by a licensing manager; and
   generating a token by said license manager;
      wherein the token enables the same user to access said resource, and
      wherein the token is generated by;
         creating a first sub-token using the first policy instance,
         creating a second sub-token using the second policy instance, and
         combining the first sub-token and the second sub-token to generate the token.

11. The method of claim 10, further comprising:
   creating a third sub-token using a third policy instance, wherein the third sub-token is created after the first sub-token has expired and the third sub-token enables the same user to access the resource.

12. The method of claim 10, wherein the license manager allows access to the resource for a period of time and the token only allows access to the resource for a portion of the period of time.

13. The method of claim 12, further comprising:
generating a new token when the portion of the period of time expires and additional time from in the period of time remains.

14. The method of claim 10, further comprising:
notifying the user when the first sub-token expires; and
renewing, by the user, the first sub-token.

15. The method of claim 10, further comprising:
monitoring the first sub-token by a token monitor associated with the resource; and
terminating access to the resource when at least one selected from the group consisting of the first sub-token and the second sub-token expires.

16. The method of claim 10, wherein the first policy type is one selected from the group consisting of by user, by usage, by client, by time, by date, and by resource.

* * * * *